United States Patent
Martin

[11] Patent Number: 5,885,675
[45] Date of Patent: Mar. 23, 1999

[54] GELATINOUS CUSHION WITH REDUCED MEMBRANE EFFECT

[75] Inventor: Jean-Luc Martin, Les Loriots, France

[73] Assignee: Epitact S.A., Loriol, France

[21] Appl. No.: 797,029

[22] Filed: Feb. 7, 1997

[30] Foreign Application Priority Data

Feb. 9, 1996 [EP] European Pat. Off. ............. 96400277

[51] Int. Cl.⁶ .................................................. G02C 5/12
[52] U.S. Cl. ......................... 428/36.5; 428/158; 428/166; 428/173; 118/131; 118/132; 118/136; 118/139; 156/242; 156/245; 264/240; 264/241; 264/252
[58] Field of Search .................................. 428/36.5, 158, 428/166, 173; 118/131, 132, 136, 139; 156/242, 245; 264/240, 241, 252

[56] References Cited

U.S. PATENT DOCUMENTS

| | | | |
|---|---|---|---|
| 2,021,890 | 11/1935 | Grier | 88/48 |
| 2,032,843 | 3/1936 | Grier | 88/48 |
| 2,216,503 | 10/1940 | Ring | 88/48 |
| 4,456,642 | 6/1984 | Burgdorfer et al. | 428/68 |
| 5,098,421 | 3/1992 | Zook | 604/367 |

FOREIGN PATENT DOCUMENTS

| | | |
|---|---|---|
| 2326717 | 4/1977 | France . |
| A-61 243858 | 10/1986 | Japan . |
| 656234 | 6/1986 | Switzerland . |
| WO 85/05700 | 12/1988 | WIPO . |
| WO 88/09156 | 12/1988 | WIPO . |

*Primary Examiner*—Charles Nold
*Attorney, Agent, or Firm*—Nilles & Nilles SC

[57] ABSTRACT

The disclosed gelatinous cushion comprises a gelatinous material enclosed in a membrane fixed to a support. The membrane has at least one told and the gelatinous material assumes the shape of the fold. The fold is arranged in such a way that the membrane unfolds when pressure is exerted on the cushion. Advantages: the elimination of the membrane effect due to the compression of the gelatinous material in the membrane, the improvement of wearing comfort and of dampening properties. Application in particular to the making of highly comfortably nose-pads for eyeglass frames.

10 Claims, 2 Drawing Sheets

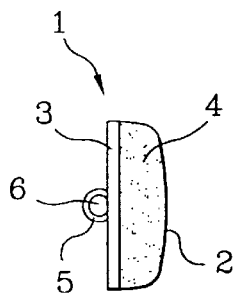
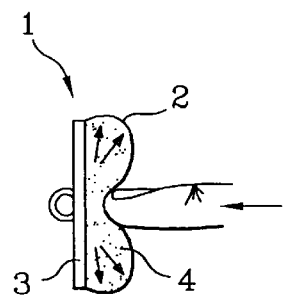
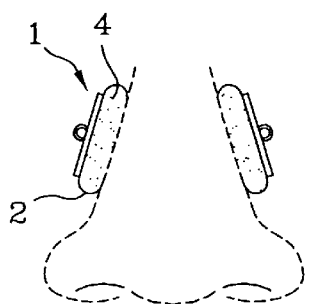
FIG.1A  FIG.1B  FIG.1C
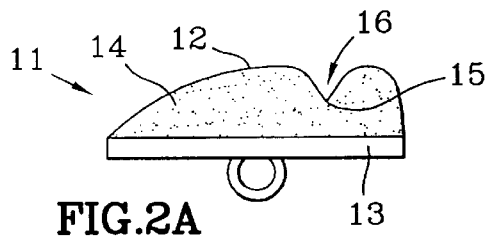
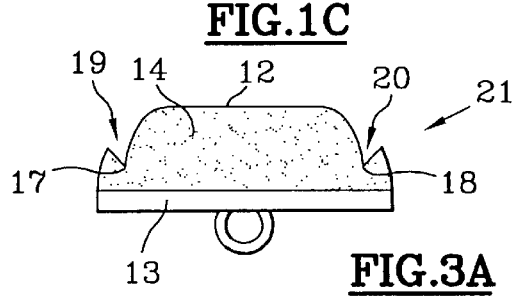
FIG.2A  FIG.3A
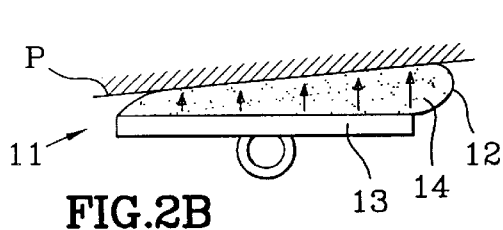
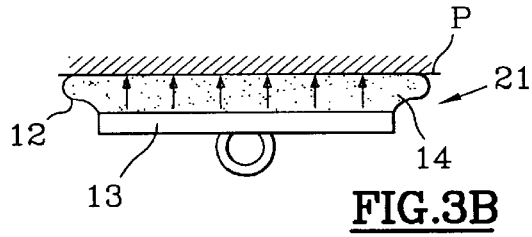
FIG.2B  FIG.3B
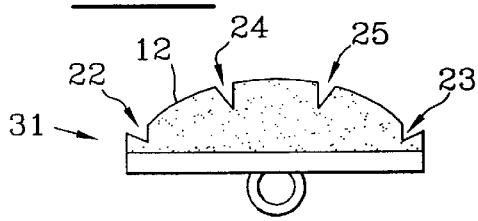
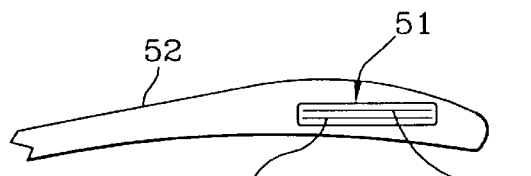
FIG.4  FIG.6
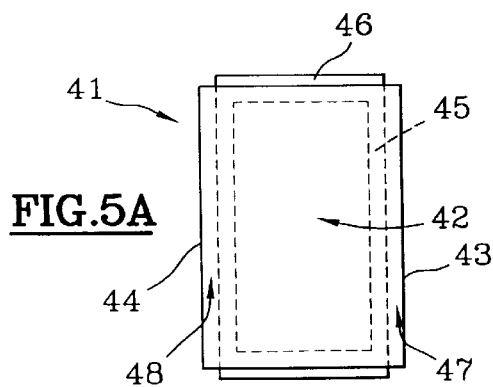
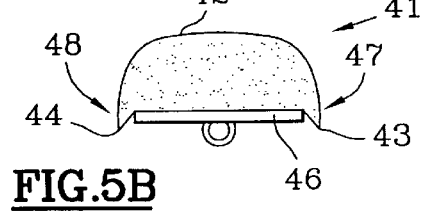
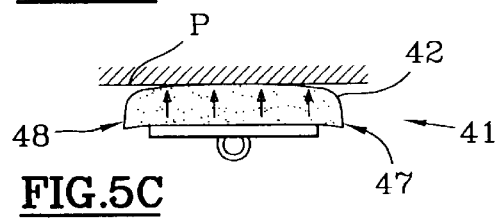
FIG.5A  FIG.5B  FIG.5C

GELATINOUS CUSHION WITH REDUCED MEMBRANE EFFECT

BACKGROUND OF THE INVENTION

1. Field of the Invention

The present invention relates to gelatinous cushions comprising a gelatinous material enclosed at least partially in a thin protective membrane.

These cushions have various applications in the field of comfortable wear. In particular, the patent applications FR 2 326 717, WO 85/05700 CH 656234 and US 2 032 843 have already proposed the mounting of such cushions on a spectacle or eyeglass frame in the areas where the frame irritates and hurts the epidermis, especially on the arms of the frame cr in the nasal support areas.

Furthermore, cushions of this kind can also be supplied in the industrial field, for example as vibration dampers.

The present invention is aimed at improving the performance characteristics of these gelatinous cushions as regards comfortable wear or the damping of shocks and vibrations.

2. Description of the Prior Art

FIGS. 1A, 1B and 1C give an exemplary view of a prior art nose pad 1 having the structure of a gelatinous cushion. The nose pad 1 has a thin elastic membrane 2 whose periphery is soldered or bonded to a rigid or semi-rigid pad-shaped support 3 made of plastic material. The membrane 2 forms a tightly sealed cavity with the support 3. A gelatinous material 4 is trapped in this cavity. The support 3 has a protrusion 5 on its other face in which a hole 6 is made enabling the mounting and hinging of the nose pad on an eyeglass frame.

The theoretical advantage of a nose pad 1 of this kind is that, under the effect of crushing, especially when the pad 1 is resting on the nose, the gelatinous material 4 absorbs the crushing force, dampens the shocks and provides an excellent degree of comfort.

However, a closer look at the "behavior" of the nose pad 1 when it is subjected to crushing, for example when it is crushed with the finger as shown in FIG. 1B, shows that, as and when the pressure on the pad is accentuated, the gelatinous effect gradually disappears and is replaced by an elastic effect due to the stretching of the membrane 2. This stretching is prompted by the compression of the gelatinous material 4 trapped in the membrane 2. This elastic stretching effect shall be called the "membrane effect". Thus, when the nose pad 1 is resting on the nose, as shown in FIG. 1C, the crushing produced by the weight of the frame is such that the membrane effect is predominant over the gelatinous effect.

In short, a prior art gelatinous cushion subjected to fairly heavy crushing displays a certain degree of hardness and does not provide wearing comfort greater than that of a cushion filled with a fluid or a gas, the membrane affect being predominant. This drawback has not been discovered in the prior art. This explains why, in the above-mentioned patents, it is proposed to fill the cushions with a gel, fluid, or gas without any distinction being made between these materials.

SUMMARY OF THE INVENTION

Thus, an object of the invention is to provide for a gelatinous cushion structure that does not have a membrane effect of this kind and is distinguished from cushions comprising a liquid or a gas.

Another object of the present invention is to provide for a nose pad for eyeglass frames that is very comfortable.

Yet another object of the present invention is to provide for a gelatinous cushion that can be used for the efficient damping of mechanical vibrations.

The present invention is based above all on the observation that, since the membrane has the function of maintaining the gelatinous material on the support of the cushion and of protecting it against tearing or wrenching, it is not possible envisage the elimination of the membrane or to provide for a loose and relaxed membrane in order to get rid of the above-mentioned membrane effect.

Thus, the present invention provides for a gelatinous cushion comprising gelatinous material enclosed at least partially in a membrane, in which the membrane has at least one fold, the gelatinous material assumes the shape of the fold of the membrane and the fold is arranged in such a way that the membrane unfolds when a pressure is exerted on the cushion.

Through to the invention, when the cushion is subjected to crushing, the membrane does not put up resistance against the deformation of the gelatinous material. The gelatinous material may get deformed without any stretching of the membrane and may attain a state of compression that enables it, by itself, to absorb the crushing force.

According to one embodiment, the fold of the membrane is oriented towards the interior of the cushion.

In this case, since the gelatinous material assumes the shape of the fold, the fold takes the shape of a slot or notch on the surface of the cushion.

According to one embodiment, the fold of the membrane is oriented towards the exterior of the cushion and forms a protrusion of the membrane that gets inflated under the effect of the crushing.

The membrane may be fixed to a rigid or semi-rigid support. This is the case in particular with a nose pad cushion.

It can also be soldered to a second membrane, that is thin or thick, forming the bottom of the cushion, or it may be fixed directly to an object that bears the cushion, for example, an arm of an eyeglass frame or the nasal support area of a frame Advantageously, the gelatinous material is a to silicone gel.

Advantageously, the membrane is a polyurethane film.

The present invention also relates to a method for the manufacture of a gelatinous cushion comprising the steps that consist in forming a polyurethane type flexible film in a mold, the bottom of the mold comprising at least one fold; filling the mold with a liquid preparation that is converted into gel after polymerization; applying a cushion support to the film so as to cover the mold; soldering the film to the support on the periphery of the mold and cutting out the film in order to detach the cushion.

BRIEF DESCRIPTION OF THE DRAWINGS

These and other objects, characteristics and advantages of the present invention shall be described in greater detail in the following description of various exemplary embodiments of cushions according to the invention and of a method for the manufacture of these cushions, with reference to the appended drawings, of which:

FIGS. 1A, 1B, 1C have already been described and represent a prior art cushion in the form of a nose pad, FIGS. 2A and 2B are sectional views of an embodiment of a cushion according to the invention taking the form of a nose pad, and show the shape of the cushion before and after crushing, FIG. 3A and 3B are sectional views of an alternative embodiment of the cushion of FIG. 2A and show the shape of the cushion before and after crushing, FIG. 4 is a sectional view of another alternative embodiment of the cushion of FIG. 2A, FIG. 5A is a top view and FIG. 5B is a sectional view of another embodiment of a cushion according to the invention forming a nose pad, and FIG. 5C shows the shape of the cushion after crushing, FIG. 6 shows an arm of an eyeglass frame on which a cushion according to the invention is positioned.

MORE DETAILED DESCRIPTION

Figure 7A:
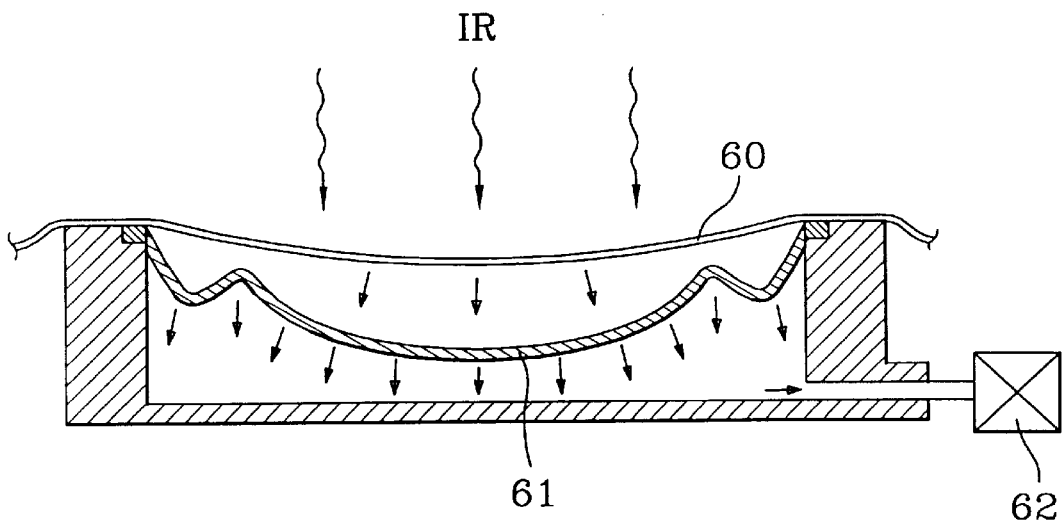
FIGS. 7A, 7B and 7C show a method for the manufacture of a cushion according to the invention.

FIGS. 2A and 2B show a longitudinal sectional view of a cushion 11 according to the invention which, in this case, takes the form of a nose pad for eyeglass frames. The cushion 11, like the cushion of FIG. 1A, comprises a membrane 12 enclosing a gelatinous material 14, the membrane being fixed to its periphery on a support 13, by soldering or bonding.

The membrane 12 is for example a polyurethane or polyamide film and the gelatinous material 14 is a silicone or polyurethane gel. The membrane 12 may have a thickness ranging from some tens of micrometers to one-hundredth of a micrometer.

According to the invention, the membrane 12 has a fold 15 oriented towards the interior of the cushion 11 and arranged transversally. The gel 14 assumes the shape of the fold 15 and the cushion 11, seen from the top, shows a feature having the appearance of a transversal slot or notch 16 with a depth of about a quarter to half of the thickness of the cushion 11.

FIG. 2B shows the cushion 11 subjected to crushing along a crushing plane P parallel or substantially parallel to the support 13. The plane P gives a view for example of the bony part of the nose, on which the cushion 11 rests. It can be seen that, under the effect of the pressure, the gel 14 takes up the space left free by the slot-shaped feature 16 and the membrane 12 is unfolded in the area in which the fold 15 had been located. Thus, advantageously, the membrane 12 is not stretched or at the limit of the state of elastic tension. Thus, the reaction of the cushion 11 to crushing is provided by the gel 14, as shown by arrows, and the elastic sensation due to the membrane affect of the prior art cushions is eliminated. In practice, the improvement provided by the present invention is felt very distinctly when a prior art cushion and a cushion according to the invention are crushed alternately with the finger. The prior art cushion hardens rapidly while the other one remains flexible. Comparative tests carried out by the Applicant on eyeglass frames fitted out with nose pads according to the invention and standard nose pads have confirmed the advantages of the invention and have shown that, in use, the comfort provided by nose pads according to the invention is appreciable.

Naturally, the cushion according to the invention must resume its initial shape after crushing. It is therefore necessary to give the gel 14 a chemical composition that ensures the necessary elasticity. This operation has no difficulty for those skilled in the art since the gels available in the market and especially the silicone gels have a very high elastic deformation capacity. Furthermore, it will be noted that the membrane 12 remains fixedly joined to the gel 14 by "suction pad effect" when this gel resumes its initial shape so that the fold 16 forms again after crushing.

FIGS. 3A and 3B show a variant 21 of the cushion that has just been described. The cushion 21 is seen in a cross-section view and its membrane 12 has two symmetrical longitudinal folds 17, 18 positioned near the edges of the cushion 21 and oriented inwards. Seen from above, the two folds 17, 18 take the shape of two longitudinal slots 19, 20, for example slots with a depth of about one-third of the thickness of the cushion. When the cushion 21 is crushed along the crushing plane P shown, the membrane 12 unfolds and takes on the appearance of a flattened mushroom as seen in FIG. 3B.

Those skilled in the art will note that the elimination of the membrane effect in a cushion according to the invention depends on the pressure applied to the cushion. If extreme pressure is applied, it is obvious that the membrane effect may reappear after a step for the compression of the gelatinous material, the present invention making it possible only to delay the pointin time when the membrane reaches the state of elastic stretching. Thus it is necessary, when designing a cushion according to the invention, to take account of the use that will be made of the cushion and the size of the crushing force that will be exerted in order to give the cushion and the gelatinous material the most appropriate shape, size and chemical composition.

FIG. 4 shows another variant 31 of the invention. The cushion 31 is seen in a cross sectional view and its membrane 12 herein has four folds oriented inwards taking the shape of four longitudinal parallel slots 22, 23, 24, 25, the slots 22, 23 being positioned symmetrically in the vicinity of the edges of the cushion 31 and the slots 24, 25 being positioned symmetrically in the vicinity of the tip of the membrane 12.

FIGS. 5a and 5B show an embodiment of a cushion 41 according to the invention, wherein the membrane 42 has two longitudinal folds 43, 44 oriented outwards. The cushion 41 is seen in a top view in FIG. 5A and in a cross-section in FIG. 5B. FIG. 5A uses dashes to show the zone 45 for the peripheral soldering of the membrane 42 to the support 46 of the cushion 41. It can be seen that the cushion 41 has two protrusions 47, 48 that go beyond the support 46. The sectional view of FIG. 5B shows that the two folds 43, 44 form the ends of the protrusions 47, 48. The sectional view of FIG. 5C show that the two protrusions 47, 48 tend to get inflated when the cushion 41 is subjected to crushing so that the membrane effect is also eliminated with this embodiment.

FIG. 6 gives an exemplary view of another application of a cushion 51 according to the invention. This cushion 51 which has an elongated shape is bonded or soldered to an arm 52 of the eyeglass frame. Two longitudinal slot-shaped features 53, 54 can be seen on the surface of the cushion 51. These slot-shaped features give the cushion the advantages of the invention. The cushion 51 may be fixed to various points of the arm 52, either to the internal face of the arm 52 as shown in the FIG. or to the lower part of the arm 52 that rests on the external ear.

Here, the support of the cushion 51 is not necessarily a rigid or semi-rigd plastic pad. The bottom of the cushion 51 may be a second, thin or thick membrane to which the membrane enclosing the gelatinous material is soldered. This support-forming second membrane may be bonded to the arm 52 or it may take the form of a sock pulled over tile eyeglass arm. Yet another variant consists of the direct soldering of the membrane enclosing the gelatinous material to the arm 52, the surface of which than forms the support of the cushion 51.

Figure 7B:
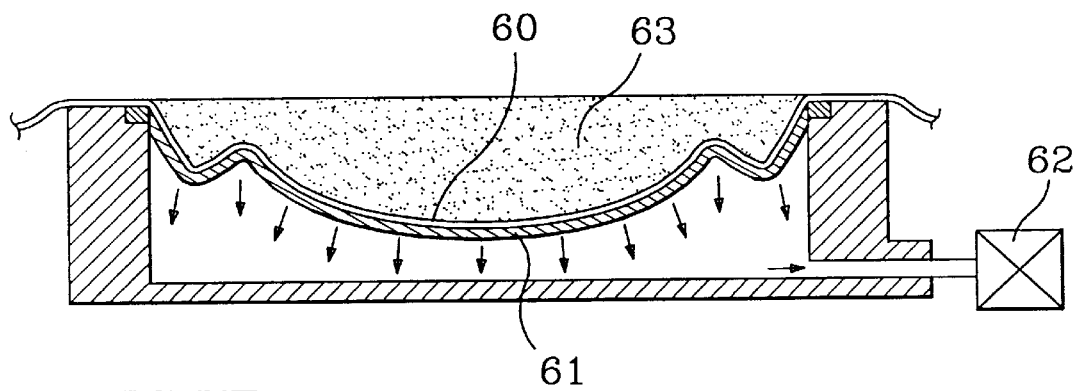
Figure 7C:
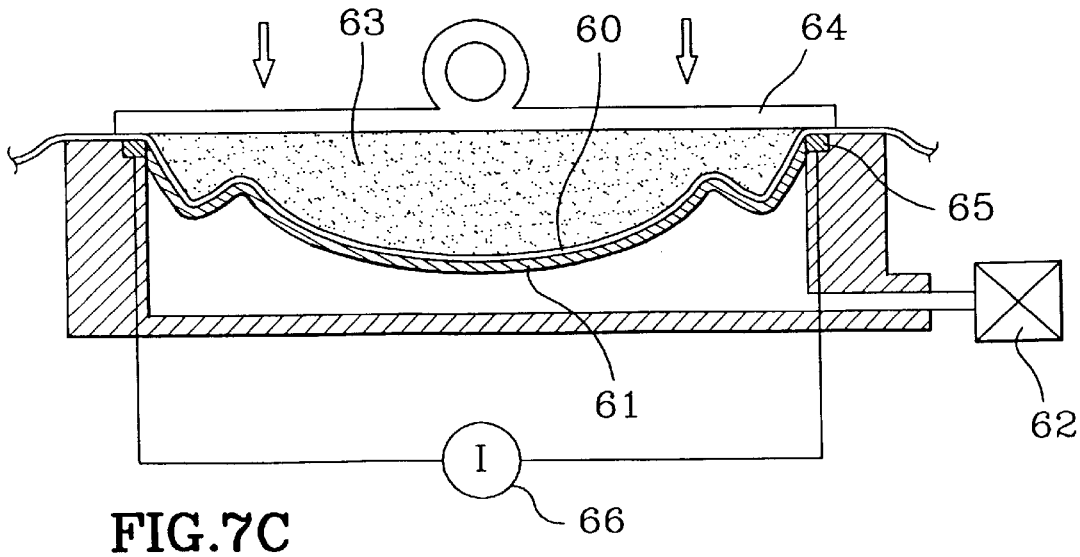

FIGS. 7A, 7B and 7C give an exemplary view of a method for the manufacture of a cushion according to the invention.

In the course of a preliminary step illustrated by FIG. 7A, a polyurethane film 60 is shaped in a porous mold 61 connected to a suction system 62. The film 60 is softened beforehand by a heat source, for example a source of infrared radiation IR and then the suction system 62 is activated. The film 60 is sucked in and placed flat against the bottom of the mold 61 to which the desired shape is given, in this case the shape of the cushion with two folds of FIG. 3A.

In the course of a following step illustrated by FIG. 7B, the suction is maintained and the mold 61 is filled with a liquid preparation 63 having two or three constituents. This liquid preparation 63 will get converted into gel after the time required for the chemical reaction. When the polymerization is completed, the particular shape given to the film 60 is fixed by the gel 63 and the suction is stopped. A gelatinous cushion according to the invention has now been made and all that remains to be done is to solder it to a support.

Thus, in the course of a step illustrated by FIG. 7C, a support 64 is positioned on the film 60 so as to entirely cover the mold 61. In the FIG., the support 64 shown is a plastic nose pad support but this support could equally well be a second membrane, or again the object to which cushion is to be attached, for example an arm of a pair of eyeglasses. The soldering of the film 60 to the support 64 is provided here by a flat resistive ring 65 driven into the mold 61 or the edge of the thermoforming orifice of the membrane 60. The resistive ring 65 is connected to a supply source 66 delivering a current I, and is taken to a temperature in the range of 180° to 200° C. for a certain time (in general a few tenths of a second suffice). During the soldering operation, a fairly great pushing force is applied to the support 54 in order to drive out the gel 63 which might be located between the film 60 and the support 64. If the support to be soldered is a single membrane, a pressing tray may be used.

The last step of the manufacturing method is not shown and consists in cutting out the film 60 in order to detach the cushion. The cutting-out operation is done in a standard way for example by means of ultrasound, knives, etc.

It will clearly be seen by those skilled in the art that the method that has just been described lends itself well to the batch manufacture of cushions, especially in providing for a mold with a plurality of thermoforming cavities.

Here above, a description has been given of application of the cushions according to the invention to an eyeglass frame. It is clear that such cushions may have many other applications and embodiments. Apart from their advantages in terms of comfort, the cushions according to the invention also have advantageous properties in terms of damping, through the elimination of the membrane effect, and may be used in purely technical applications. In particular, the Applicant has envisaged the placing of such cushions in lighting systems in order to eliminate the mains frequency humming created by neon lamps.

What is claimed is:

1. A gelatinous cushion comprising gelatinous material enclosed at least partially in a membrane, in which:

said membrane has at least one fold, said gelatinous material assumes the shape of the told of said membrane, said fold is arranged in such a way that the membrane unfolds when a pressure is exerted on the cushion.

2. A cushion according to claim 1 wherein said fold of said membrane is oriented towards the interior of the cushion and forms a slot shape or notch shape on the surface of the cushion.

3. A cushion according to claim 1, wherein said fold of said membrane is oriented towards the exterior of the cushion and forms a protrusion of the membrane that gets inflated under the effect of the crushing.

4. A cushion according to claim 1, comprising at least two symmetrically positioned folds.

5. A cushion according to claim 1, wherein said membrane is fixed to a rigid or semi-rigid support.

6. A cushion according to claim 1, wherein said membrane is soldered to a second membrane forming the bottom of the cushion.

7. A cushion according to claim 1, wherein said membrane is fixed directly to an object that bears the cushion.

8. A cushion according to claim 1, wherein said membrane is a polyurethane film.

9. A cushion according to claim 1, wherein said gelatinous material is a silicone gel.

10. A method for the manufacture of a gelatinous cushion comprising the stems that consist in:

forming a polyurethane type flexible film in a mold, the bottom of said mold comprising at least one fold, filling the mold with a liquid preparation that gets converted into gel after polymerization, applying a cushion support to said film so as to cover the mold, soldering the film to the support on the periphery of the mold and cutting out the film in order to detach the cushion.

* * * * *

UNITED STATES PATENT AND TRADEMARK OFFICE
CERTIFICATE OF CORRECTION

PATENT NO. : 5,885,675
DATED : March 23, 1999
INVENTOR(S) : Jean-Luc MARTIN

It is certified that error appears in the above-identified patent and that said Letters Patent is hereby corrected as shown below:

In the Abstract, line 3, delete "told" and substitute -- fold --.

Column 6, line 11, delete "told" and substitute -- fold --.

Signed and Sealed this

Thirteenth Day of July, 1999

Attest:

Q. TODD DICKINSON

*Attesting Officer*   *Acting Commissioner of Patents and Trademarks*